Figure 1:
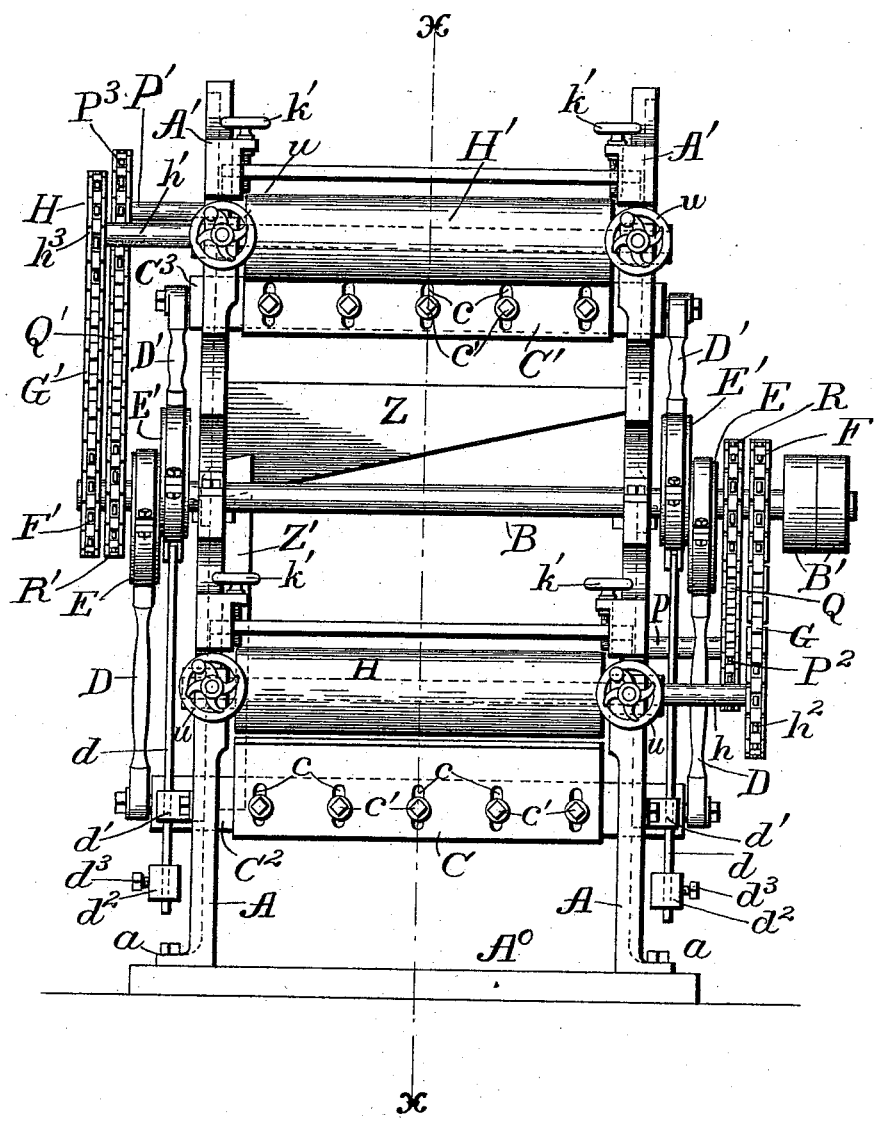

(No Model.) 4 Sheets—Sheet 1.

O. F. GOODWIN.
ROLLER COTTON GIN.

No. 530,941. Patented Dec. 18, 1894.

Witnesses
Percy C. Bowen
John C. Wilson

Inventor
Otis F. Goodwin,
by Whitman & Wilkinson
Attorneys (No Model.) 4 Sheets—Sheet 2.
O. F. GOODWIN.
ROLLER COTTON GIN.
No. 530,941. Patented Dec. 18, 1894.
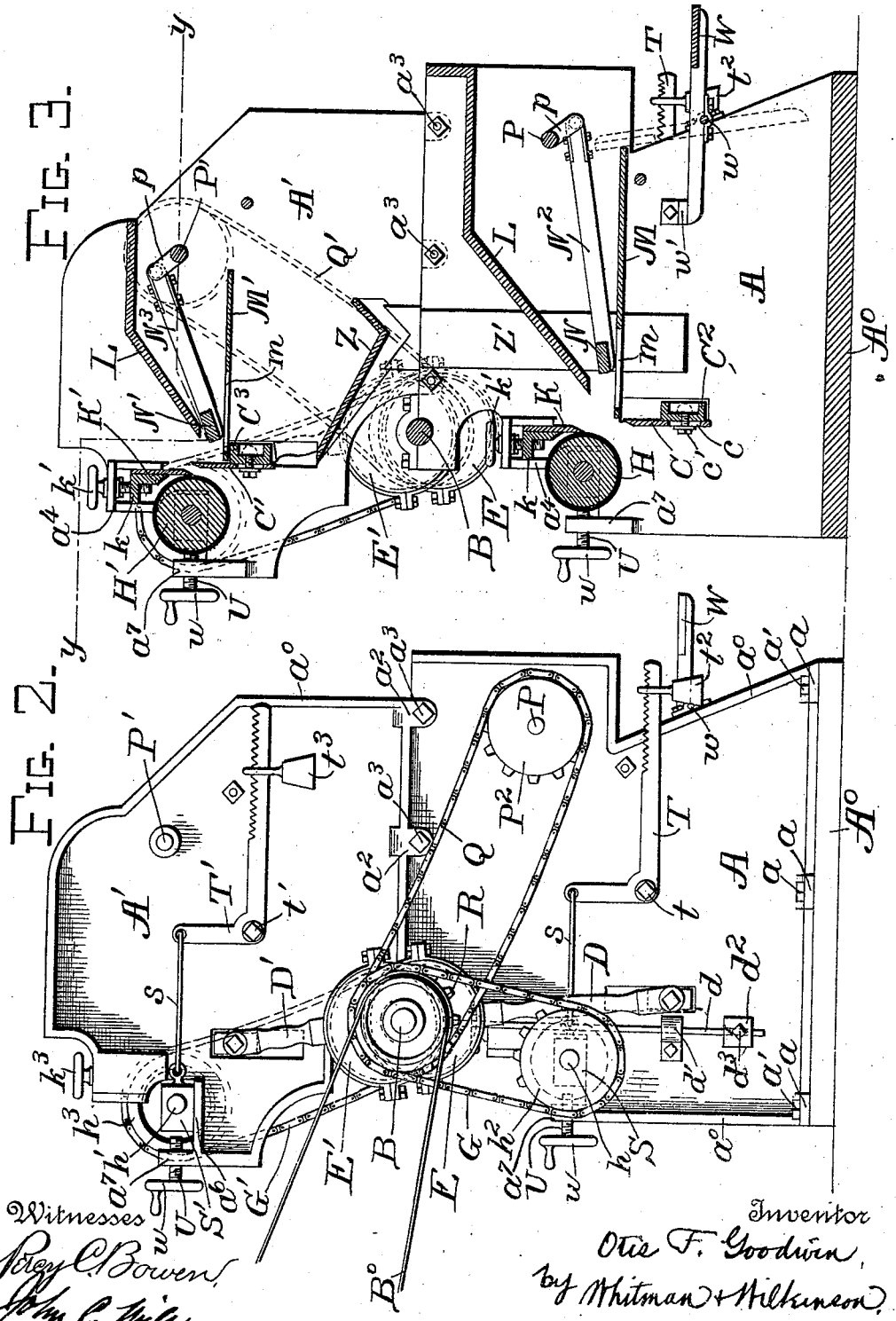
Witnesses
Inventor
Otis F. Goodwin
by Whitman & Wilkinson
Attorneys (No Model.) 4 Sheets—Sheet 3.
O. F. GOODWIN.
ROLLER COTTON GIN.
No. 530,941. Patented Dec. 18, 1894.
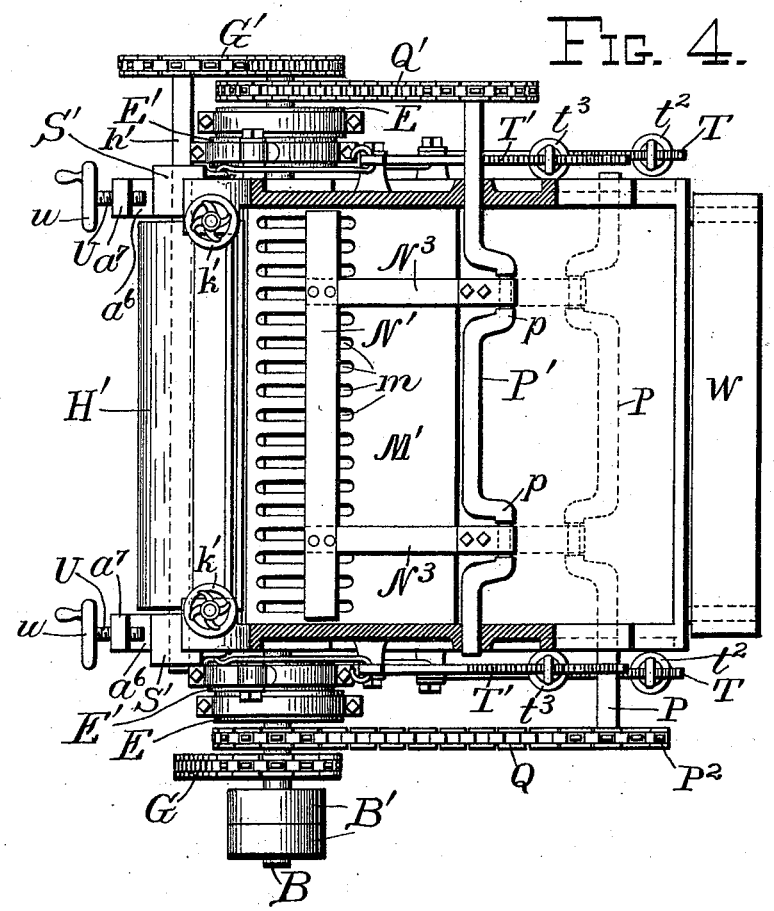
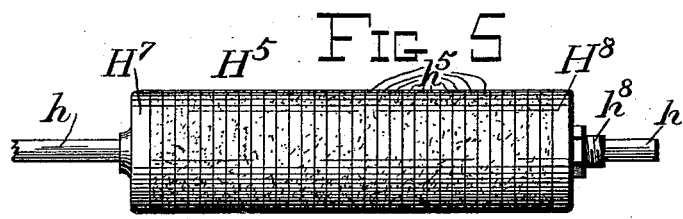
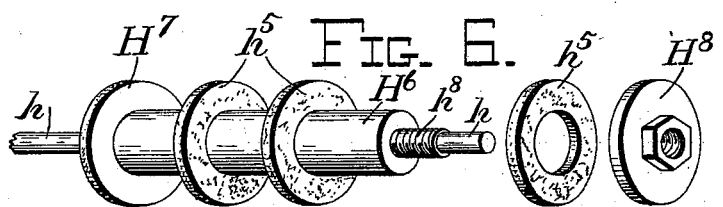

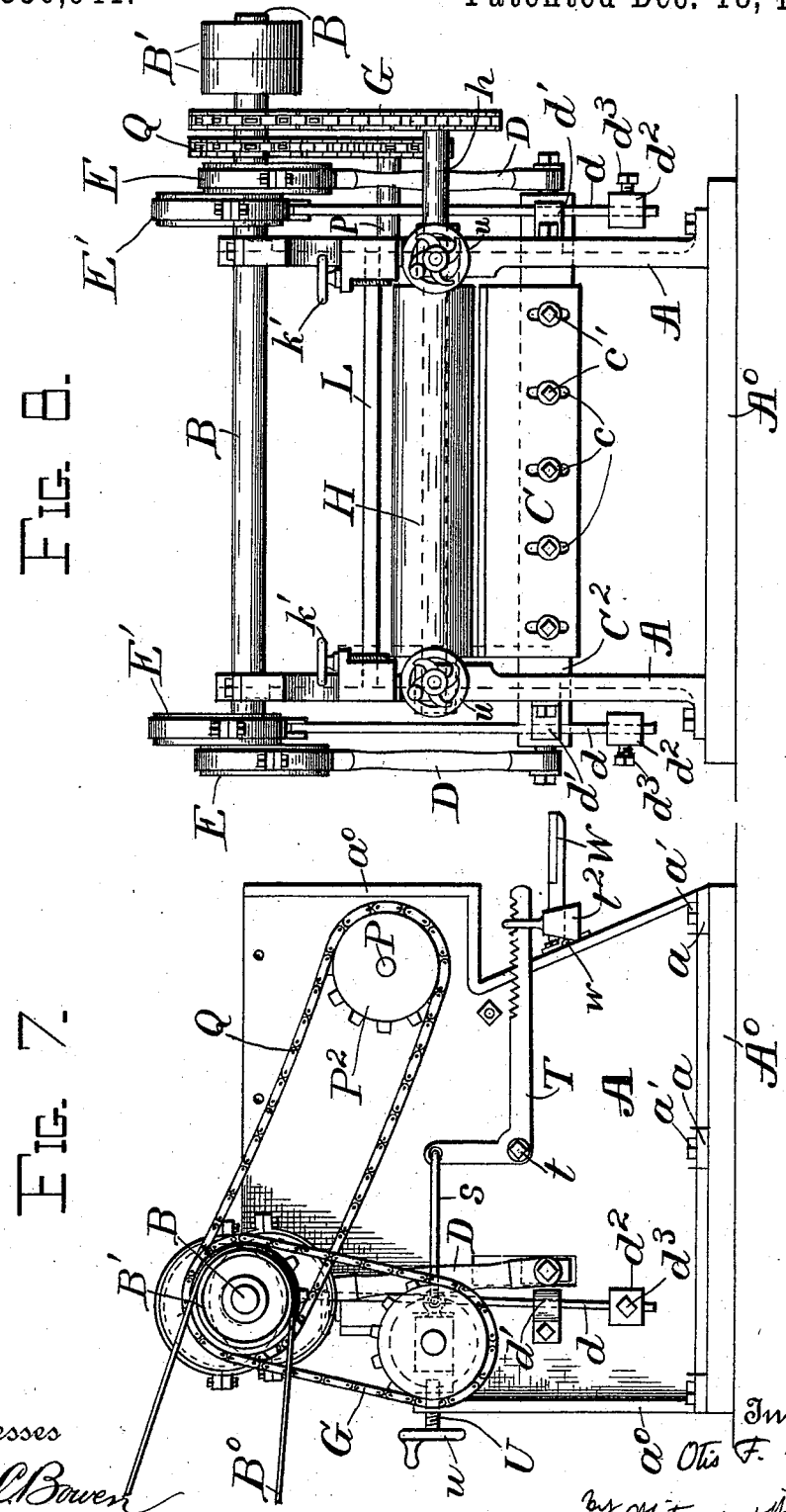

UNITED STATES PATENT OFFICE.

OTIS F. GOODWIN, OF VALDOSTA, GEORGIA.

ROLLER COTTON-GIN.

SPECIFICATION forming part of Letters Patent No. 530,941, dated December 18, 1894.

Application filed March 7, 1894. Serial No. 502,735. (No model.)

*To all whom it may concern:*

Be it known that I, OTIS F. GOODWIN, a citizen of the United States, residing at Valdosta, in the county of Lowndes and State of Georgia, have invented certain new and useful Improvements in Roller Cotton-Gins; and I do hereby declare the following to be a full, clear, and exact description of the invention, such as will enable others skilled in the art to which it appertains to make and use the same.

My present invention relates to cotton gins of the class known as "roller" or "drum" gins, or as they are sometimes called "long-cotton" gins. Gins of this class are especially adapted for ginning long fiber cotton, such for instance as sea-island cotton, the advantage being that the long fibers are not torn or broken as with the saw gins which are largely in use for ginning cotton of short fiber.

My invention relates especially to certain improvements over the gin described in my Patent No. 497,652, and dated May 16, 1893, and it consists of certain novel features hereinafter described and claimed.

Reference is had to the accompanying drawings in which the same parts are indicated by the same letters throughout the several views.

Figure 1 represents an end view of my improved double gin. Fig. 2 represents a side elevation of the gin shown in Fig. 1, as seen from the right of the said figure. Fig. 3 represents a section along the line $x\ x$ of Fig. 1, as seen from the right of the said figure. Fig. 4 represents a plan view of the gin shown in Figs. 1 to 3. Fig. 5 represents a view of one of the built up cork rollers adapted for use in the said gin. Fig. 6 is a perspective view and represents the method of making the roller shown in Fig. 5. Fig. 7 represents the lower gin shown in Figs. 1 to 3, the upper gin being removed, and the device being adapted for use as a single gin. (The figure is a side elevation corresponding with that shown in Fig. 2.) Fig. 8 is a similar view of the gin shown in Fig. 1, to that represented in Fig. 7, in which latter figure the upper gin is in place.

A represents a metal frame mounted on the platform $A^0$, and provided with a strengthening rib $a^0$, around the outer portion thereof. This frame is secured to the said platform by means of the lugs $a$, and bolts $a'$. Mounted on this frame A is a second similar frame A', which is secured to the lower frame by means of the downwardly projecting lugs $a^2$ and the bolts $a^3$. Each of these frames A and A' carries suitable mechanism for ginning cotton, and hence the whole apparatus constitutes a double or two-storied gin, which will be hereinafter described.

B represents the driving shaft on which are mounted the fast and loose pulleys B', driven by the belt $B^0$, impelled by the source of power which may be of any suitable kind, and is not shown. This driving shaft is journaled in the upper portion of the frame A.

C represents the lower reciprocating knife, for the lower gin, and C' represents the reciprocating knife for the upper gin, which reciprocating knives are secured respectively to the sliding beams $C^2$ and $C^3$, to which the eccentric rods D and D', are revolubly connected, these eccentric rods being given a reciprocal motion by means of the pairs of eccentrics E and E' mounted on each end of the driving shaft B. These reciprocating knives are slotted as at $c$, so that they may be adjustably secured by means of the bolts $c'$ to the beams $C^2$ and $C^3$.

Each eccentric E' is provided with a downwardly projecting rod $d$ moving in a guide $d'$ attached to the side of the frame A, to which rod a suitable weight $d^2$ is secured by means of the set screw $d^3$. When the gin is used as a single gin as shown in Figs. 7 and 8, these weights $d^2$ should be made heavy enough to act as a counterpoise to the knife C and the various parts connecting it to the eccentrics E, and in this way the two eccentrics and connected parts balance each other causing the machine to work very much more smoothly than where no such compensation is made. Where both knives are in operation, as is shown in Figs. 1 to 3 the two knives may be made to balance each other, in which case the weight $d^2$ may be dispensed with; but if the upper knife, which is nearer to the driving shaft than the lower and hence has shorter connecting rods D' and consequently lighter rods, or which knife would ordinarily be made lighter than the lower knife as not intended for use when the upper part of the machine was removed, or if this knife and its attachments be lighter than the lower knife and its attachments, then suitable compensating weights $d^2$ might be secured to the rods $d$, as already described.

The rollers H and H' are driven by the sprocket chains G and G', gearing in sprocket wheels F and F' fast on the driving shaft B. These rollers may be of any desired type, but are preferably of the construction shown in Figs. 5 and 6, in which the roller H consists of a drum $H^6$ fast on the shaft $h$, a circular head $H^7$ fast at one end of said drum, a plurality of disks of cork annular in shape slipped over the drum $H^6$ and compressed between the fast head $H^7$, and the movable head $H^8$ which is screw-threaded at its center and screws up on the male screw $h^8$ on the shaft $h$. By this construction the head $H^8$ may be readily removed, and disks that have been worn may be shifted about on the roller, thus correcting lack of uniformity in the wire, or one or more entirely new disks may be supplied. The rollers H and H' are mounted on the shafts $h$ and $h'$ respectively, which shafts carry the sprocket wheels $h^2$ and $h^3$, meshing in the chains G and G'; and the said shafts are journaled in the blocks S and S' which are adjusted in the frame work, as will be hereinafter described.

K and K' represent the fixed knives which are mounted in angle beams $k$ moving in guide-ways $A^4$ in the frames A and A' respectively. These knives or blades are adjusted by means of the hand wheels $k'$ connected to adjusting screws passing through the said angle beam $k$ as shown in detail in Fig. 3. Each of the frames is provided with a feed chute L.

M and M' represent floors or platforms provided with openings $m$, sufficiently large to allow the cotton seed to drop through.

N and N' represent pushers for pushing the seed cotton toward the knives. These pushers are connected by rods $N^2$ and $N^3$ and cranks $p$ to the shafts P and P' respectively. These shafts carry sprocket wheels $P^2$ and $P^3$ meshing in the chains Q and Q' respectively, which are driven by the sprocket wheels R and R' fast on the driving shaft B.

The blocks S and S' in which the shafts of the rollers are mounted are similar in every respect and hence but one of said blocks is shown in detail. (See Figs. 2 and 4.) These blocks travel in suitable guids $a^6$ forming part of the frame and are connected by rods $s$, to the bell-crank levers T and T' pivoted at $t$ and $t'$ to the sides of the frames A and A'. The outer ends of these levers carry sliding weights $t^2$ and $t^3$ by means of which the tension of the roller may be adjusted, and yet at the same time the roller may be able to give when occasion demands. In order to limit the opposite motion of the roller I provide screws U passing through the lugs $a^7$ in the frames and terminating in hand-wheels $u$. By turning these hand-wheels the distance of the inner end of the screw from the face of the journal block S, or S', may be varied at will and hence the distance through which the roller is capable of moving backward may be limited as desired.

W represents a step pivoted at $w$ to the lower frame and having inward projecting arms adapted to engage beneath the lugs $w'$ secured to the sides of said frame, as shown in Fig. 3. When using the lower gin as a single gin this step may be swung upward out of the way, while it may be kept down when the machine is being used as a double gin, for the purpose of enabling the operator to reach the upper feed table and chute L. The cotton seed dropping from the upper gin falls in a trough Z, shown in Fig. 3, which trough slopes toward one side and terminates in a chute Z' down which the seed falls into the base of the lower gin, (without passing through the cotton being treated in said lower gin) whence it is removed in the usual way.

It will be seen that the herein described device is in reality two gins mounted one above another and yet provided with only one driving shaft B, from which the various parts of both the gins are operated. In this way considerable economy in gearing, shafting, &c., is obtained. The balancing effect of the two vibrating knives or clipper blades is also obtained, and it becomes possible for one attendant to feed both gins, and otherwise economizes both his material and labor.

Should, for any reason, it be desired to work the gin singly, this may be done without taking the two apart; but where this is to be done for any length of time, it would ordinarily be preferable to take off the sprocket chains G' and Q', and also the connecting rod D', and then unscrewing the bolts $a^3$ to take the top gin off, when the machine will be a single gin such as is shown in Figs. 7 and 8.

Having thus described my invention, what I claim, and desire to secure by Letters Patent of the United States, is—

1. In a machine for ginning cotton, the combination with the frame A and the frame A' mounted thereon and bolted together, of the driving shaft B journaled in the lower frame, eccentrics fast on said shaft and set at an angle of approximately one hundred and eighty degrees from each other, eccentric rods and straps operated by said eccentrics, reciprocating knives connected to said eccentric rods and arranged the one above and the other below said driving shaft, rods, and weights detachably connected to said rods, for exactly balancing the weight of said knives, and fixed knives and rollers mounted in each frame, with means for feeding the cotton to said knives, substantially as and for the purposes described.

2. In a machine for ginning cotton, the comnation with the frame A and the frame A' mounted thereon and bolted together, of the driving shaft B journaled in the lower frame and carrying eccentrics E and E', and sprocket wheels F and F' and R and R' fast thereon; of the reciprocating knives C and C' mounted on bars $C^2$ and $C^3$, respectively, moving in guides in said frames; the eccentric rods D and D' and eccentric straps connecting said bars to the said eccentrics; the rollers H and H' revolubly mounted in the upper and lower frames, respectively, and mounted on shafts $h$ and $h'$ carrying sprocket wheels $h^2$ and $h^3$; the sprocket chains G and G' gearing in said sprocket wheels F and $h^2$, and F' and $h^3$, respectively, and driving said rollers; the fixed knives K and K' mounted in said frames; the chutes L and L', floors M and M' slotted at $m$, the pushers N and N', connecting rods $N^2$ and $N^3$, crank shafts P and P', sprocket wheels $P^2$ and $P^3$ mounted on said shafts, and sprocket chains gearing in said sprocket wheels $P^2$ and $P^3$ and said sprocket wheels R and R', substantially as and for the purposes described.

3. In a machine for ginning cotton, the combination with the frame A, of the driving shaft B journaled therein, the eccentrics E and E' set at an angle of approximately one hundred and eighty degrees fast on said shaft, the reciprocating knife, or clipper blade C, moving in guides in said frame, the eccentric rods D connecting one of said eccentrics with said reciprocating knife, the eccentric rods $d$ moving in guides $d'$ attached to said frame and connected to the strap on the other eccentric, and weights $d^2$ detachably secured to said eccentric rods $d$, for the purpose of balancing the reciprocating blade, substantially as described.

In testimony whereof I affix my signature in presence of two witnesses.

OTIS F. GOODWIN.

Witnesses:
N. A. WILLIAMS,
MAXCY ASHLEY.